2,372,789

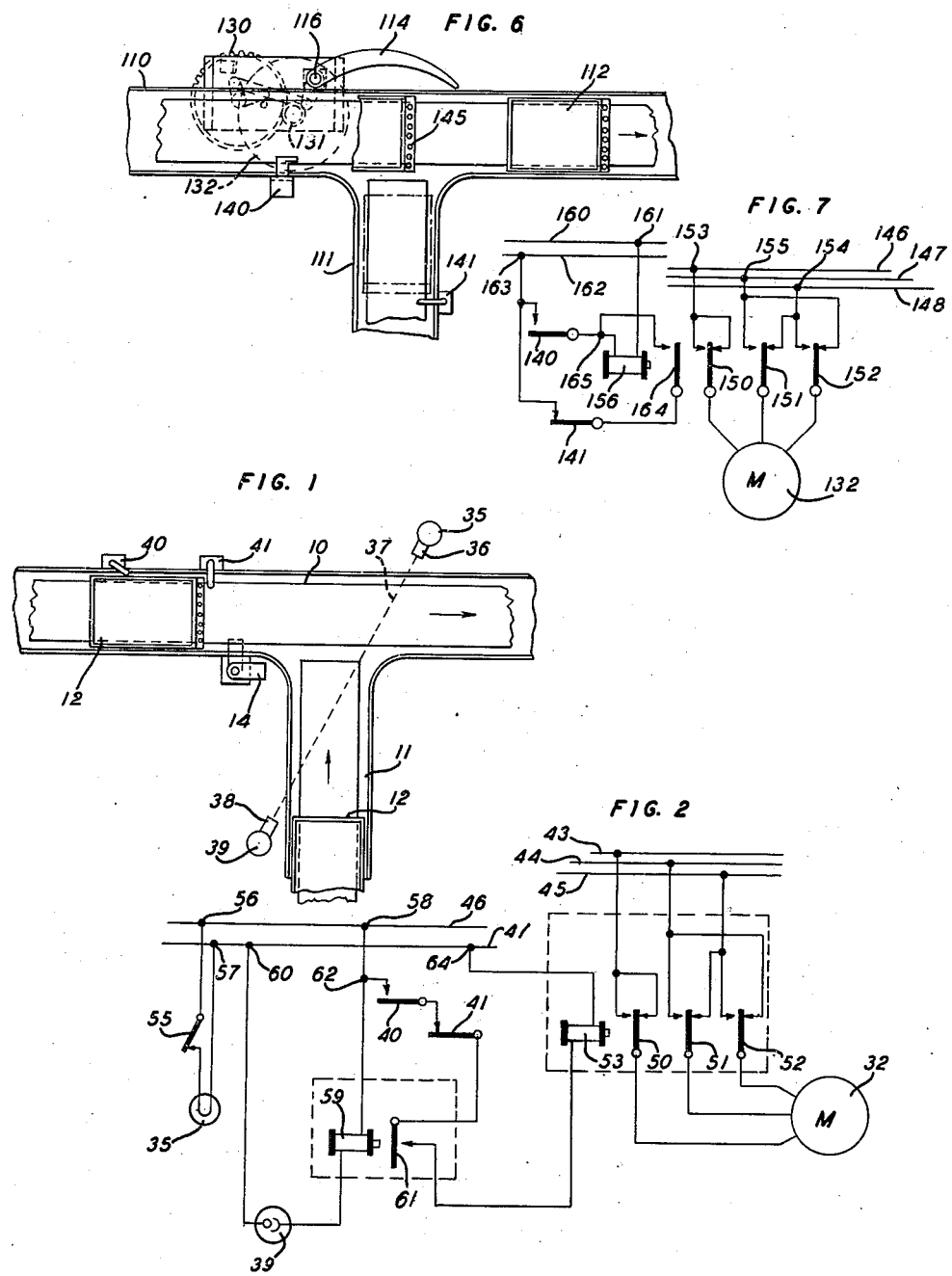
April 3, 1945.  D. H. MITCHELL  2,372,789
CONVEYER SYSTEM
Filed May 5, 1942  2 Sheets-Sheet 1
INVENTOR
D.H. MITCHELL
BY
E.R. Nowlan
ATTORNEY April 3, 1945.                D. H. MITCHELL                 2,372,789
                              CONVEYER SYSTEM
                           Filed May 5, 1942              2 Sheets-Sheet 2
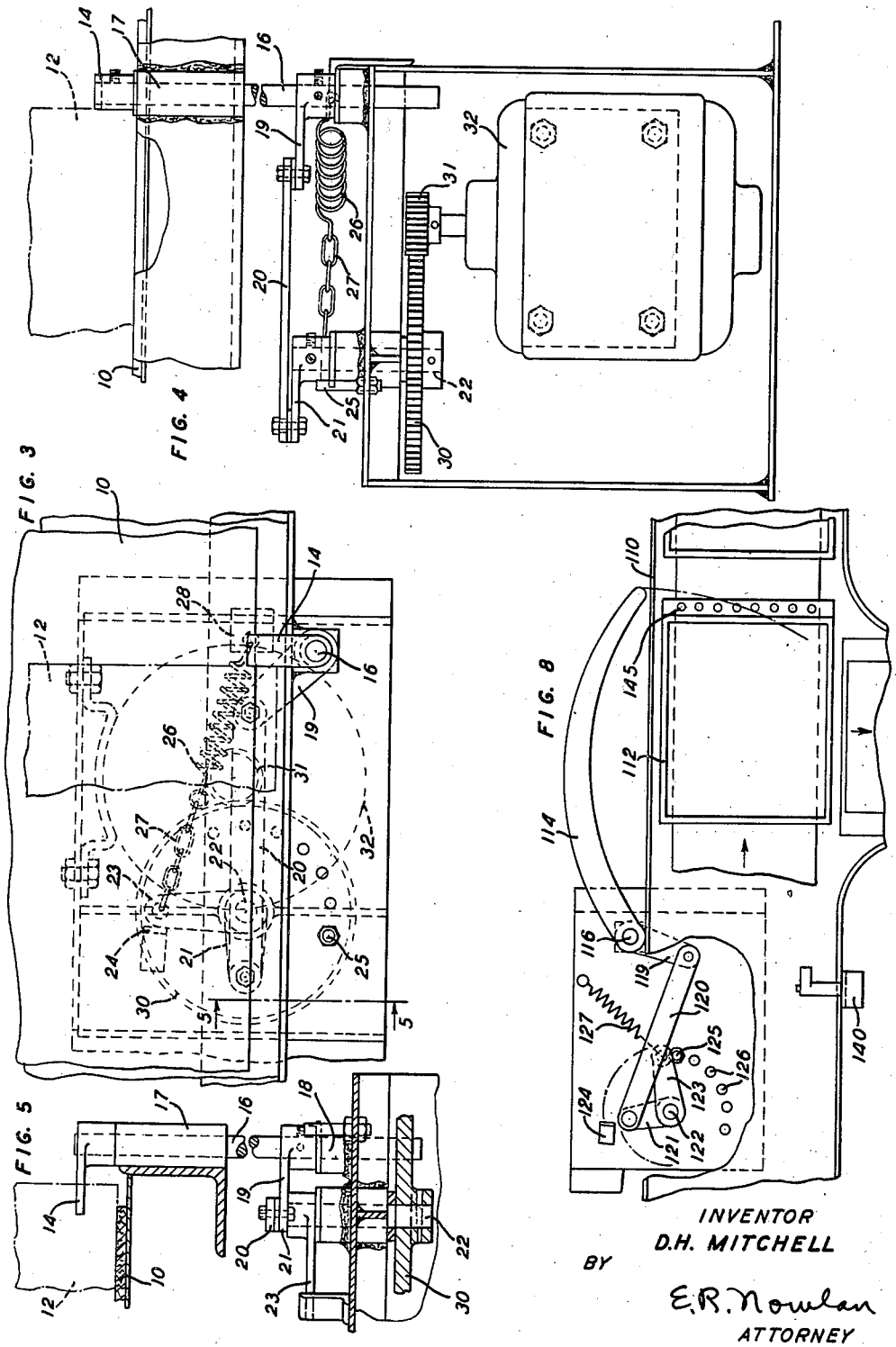
INVENTOR
D.H. MITCHELL
BY
E.R. Nowlan
ATTORNEY Patented Apr. 3, 1945

UNITED STATES PATENT OFFICE 2,372,789

CONVEYER SYSTEM

Donald H. Mitchell, Cranford, N. J., assignor to Western Electric Company, Incorporated, New York, N. Y., a corporation of New York Application May 5, 1942, Serial No. 441,798

12 Claims. (Cl. 198—21)

This invention relates to conveyer systems, and more particularly to article controlling means therefor.

In conveyer systems where a plurality of conveyers is employed to direct articles, or carriers therefor, from one conveyer to another in their travel about the system, a traffic control means is necessary to eliminate jamming of the articles at the junctures of the different conveyers. Such traffic control means must not only be highly efficient but, if mechanisms are provided to hold articles on one conveyer against movement during the free travelling of other articles, from an associated conveyer, onto the one where the articles are held, such mechanism must be sufficiently durable and readily actuable to perform these functions.

An object of the invention is to provide a conveyer system and more particularly a simple, efficient and highly practical article or carrier control means therefor.

With this and other objects in view, the invention comprises an article controlling element disposed adjacent the juncture of two conveyers, the element being operatively connected to a mechanism adapted to move it into and out of a stopping position over one conveyer to control the travel of articles thereon, the mechanism being under the control of means affected by articles travelling on the other conveyer to eliminate jamming of the articles at the juncture of the two conveyers.

Other objects and advantages will be apparent from the following detailed description when considered in conjunction with the accompanying drawings, wherein Fig. 1 is a schematic top plan view of a fragmentary portion of a conveyer system illustrating one embodiment of the invention;

Fig. 2 is a wiring diagram illustrating the electrical circuits of the electrical control portion of the embodiment shown in Fig. 1;

Fig. 3 is an enlarged fragmentary top plan view of a portion of the control mechanism of this embodiment;

Fig. 4 is a front elevational view of the structure shown in Fig. 3;

Fig. 5 is a fragmentary detailed view taken substantially along the line 5—5 of Fig. 3;

Fig. 6 is a schematic top plan view of a fragmentary portion of a conveyer system illustrating another embodiment of the invention;

Fig. 7 is a wiring diagram illustrating the electrical circuits of the electrical control portion of the embodiment shown in Fig. 6, and Fig. 8 is an enlarged fragmentary top plan view of the deflecting mechanism of the second embodiment.

Referring now to the drawings, attention is first directed to Fig. 1, which illustrates conveyers 10 and 11, of one embodiment of the invention, which may be of the endless belt type, travelling in the direction of the arrows to convey articles or carriers 12 thereon in paths, one of which converges with the other tangentially. The carriers 12 travelling on the conveyer 10, if not interrupted will continue past the conveyer 11 and travel on to other conveyers of the system not shown. The conveyer 11 empties onto the conveyer 10, that is the carriers 12 travelling on the conveyer 11 will be transferred onto the conveyer 10 at the juncture of these conveyers. If no means were provided to control the traffic of the carriers on these conveyers, eventually there would occur jamming of the carriers at the juncture of the conveyers. To eliminate this disturbance an article or carrier controlling element 14 is positioned adjacent the juncture of the conveyers for stopping the carriers on the conveyer 10 which are approaching the conveyer 11. The only time when such an action is necessary is when a carrier on the conveyer 11 approaches the juncture of the conveyers at a time when it might collide with a carrier on the conveyer 10. Therefore, a control means has been provided which will be rendered operable by carriers on the conveyer 11 approaching the exit end thereof, to cause operation of the element 14 to bring about movement thereof from the solid line position shown in Fig. 1 to the dotted line position extending in the path of approaching carriers on the conveyer 10.

For a better understanding of the specific structure of the element 14 and its associated mechanism, attention is directed to Figs. 3, 4 and 5. The element 14 is in the form of an arm mounted fixedly upon the upper end of a shaft 16, the latter being journalled in suitable bearings 17 and 18. A lever 19 is mounted on the shaft 16 beneath the conveyer 10, the outer end of the lever being pivotally connected to one end of a link 20. The other end of the link 20 is connected pivotally to a lever 21, the latter being mounted upon the upper end of a shaft 22. Another lever 23 is also mounted upon the shaft 22, this lever extending at right angles to the lever 21 and serving in cooperation with fixed stops 24 and 25 to limit the movement of the associated mechanism connected with the element 14, to thus limit the positions of the element, as shown in Fig. 1, namely its normal position parallel with the conveyer, or its stopping position across the conveyer. A helical tension spring 26, assisted by a chain 27, provides a resilient connection between a stationary bracket 28 and the outer end of the lever 23, to serve as a cushioning means for the lever in approaching either of its stops 24 or 25.

Returning now to the shaft 22, it will be noted that a gear 30 is mounted upon the lower end thereof, this gear interengaging a pinion 31 which is driven by a torque motor 32. Briefly, energization of the motor 32 in one direction will cause driving of the mechanism to move the element 14 into one position, a reversing of the motor causing movement of the element into its other position.

Attention is now directed to Figs. 1 and 2. In the schematic illustration in Fig. 1, a lamp 35 adapted to be illuminated will, through the association of a restricting lens 36, project a beam of light 37 in a path diagonally across the conveyers 10 and 11 at their juncture, to be received by another lens 38 to effectively control a light sensitive means 39, such as a photoelectric cell. It will be apparent that a carrier 12 on the conveyer 11 approaching the conveyer 10 will interrupt the beam 37 a suitable distance in advance of the exit end of the conveyer 11 and will continue this interruption of the beam until after the said carrier has moved onto the conveyer 10 and has travelled beyond the juncture of the two conveyers.

Before considering the wiring diagram in Fig. 2, attention is first directed to limit switches 40 and 41 mounted at the side of the conveyer 10 and disposed at spaced positions with respect to the juncture of the two conveyers and the position of the element 14, to perform their functions in the controlling of the element by the carriers travelling in the conveyer 10. It will be noticed that the limit switches, although spaced apart, are sufficiently close to one another that a single carrier may actuate both of them, that is the same carrier may actuate the switch 41 after it has actuated the switch 40 and before it releases the latter.

Referring now to the wiring diagram, it will be noted that two groups of supply lines are illustrated, one group including lines 43, 44 and 45 and the other group including lines 46 and 47, the first group in the present embodiment being electrically connected to a 440-volt supply of electrical energy for the motor 32, the other group being electrically connected to a 110-volt supply of electrical energy. Considering the motor circuits first, it will be noted that the conductors from the motor 32 are connected to contacts 50, 51 and 52 which are normally closed, as illustrated, for electrical connection with lines 43, 45 and 44 respectively. The contacts 50, 51 and 52 are under the control of a relay 53 which, when energized, will pull up the contacts, opening the circuits in which they are normally connected and closing circuits which will complete their respective connections with lines 43, 44 and 45. Thus the motor 32 during the normal positions of the contacts, will be driven in one direction to urge the mechanism connecting it with the element 14, to position the element in the normal or solid line position shown in Fig. 1. However, when the beam 37 is interrupted and a carrier on the conveyer 10 is in the position, shown in Fig. 1, to actuate the switch 40, the relay 53 will be energized to actuate the contacts to reverse the motor 32.

Referring now to the other portion of the wiring diagram, the lamp 35 is electrically connected to the supply lines through the closing of a switch 55, the circuit being traced from line 46 at connection 56, through switch 55, lamp 35, to line 47 at connection 57. The circuit, through the light sensitive cell 39, may be traced from line 46 at connection 58, through a relay 59, the cell 39, to line 47 at connection 60. The relay 59 controls a contact 61 which is normally open to complete a circuit through the relay 53 when both switches 40 and 41 are closed, this circuit being traced from line 46 at connection 58, through connection 62, switches 40 and 41, contact 61, relay 53, to line 47 at connection 64.

Considering now the operation of the conveyer system, attention is first directed to the illustration shown in Fig. 1. In this illustration a carrier 12 is travelling on the conveyer 10 and has moved to a position to close the normally open switch 40 and is about to open the normally closed switch 41. At the same time a carrier is travelling on the conveyer 11 approaching the beam of light 37. With the present illustration, if the carrier on the conveyer 10 opens the switch 41 prior to the interruption of the beam 37 by the carrier on the conveyer 11, the circuit including the relay 53 will be opened by the opening of the switch 41, and as a result the element 14 will remain in the solid line position. In other words, if a carrier on the conveyer 10 can travel far enough to actuate the switch 41, it is in a safe position to continue its travel without interfering with the carrier on the conveyer 11, the latter being spaced a sufficient distance from the juncture of the two conveyers so that it will not interrupt the beam prior to the opening of the switch 41. Thus the carrier on the conveyer 10 will have passed the conveyer 11 before the carrier on that conveyer reaches the conveyer 10.

However, if the beam 37 is interrupted by the carrier on the conveyer 11 prior to the opening of the switch 41 and after the closing of the switch 40, the circuit including the relay 53 will be closed through the energization of the relay 59 rendered effective by the interruption of the beam 37, to complete the circuit through the relay 53, resulting in the pulling up of the contacts 50, 51 and 52 and the reversing of the motor 32. When the motor is reversed the mechanism, including the driving of the pinion 31, the gear 30, the shaft 22, the lever 21, the link 20, the lever 19 and the shaft 16, will be moved into the position shown in Figs. 3, 4 and 5 to move the element 14 from the solid line position shown in Fig. 1 to the dotted line position shown therein and the solid line positions shown in Figs. 3, 4 and 5. The motor 32 will remain energized, the mechanism associated therewith being held against further movement by the lever 23 engaging the stop 24. When in this position attention is directed to the relative positions of the centers connecting the link 20 with its levers 19 and 21 and the shaft 22, which are in a common plane, that is, these parts are on dead center.

When in this position the parts holding the element 14 in the path of the carriers on the conveyer 10 have the holding force of a solid connection for the element, and due to this dead center arrangement of the parts the element is capable of holding a large number of carriers, if necessary, against movement past the conveyer 11, considering even the increased force of the continuously moving conveyer 10 on the increased number of carriers and the additional impact of the added carriers with those being held by the element. The element remains in this position while the carrier travelling on conveyer 11 has interrupted the beam 37 and until the beam is no longer interrupted. When this time arrives the effect of the beam of light 37 on the light sensitive cell 39 will cause energization of the relay 59, to allow the contact 61 to open, thus opening the circuit including the relay 53. Thus the contacts 50, 51 and 52 will move again into their normal positions shown in Fig. 2, to cause the motor to drive in a direction to return the mechanism and the element 14 to their normal positions.

With the control mechanism functioning through the positions of the carriers on the conveyers, it will be evident that the traffic on the conveyers will be completely and automatically controlled to eliminate any possible jamming at the juncture of the conveyers, the mechanical means linked with the element 14 being of such a nature that the element may be readily actuated for movement into and out of article or carrier controlling position, yet when in this position it will hold any number of carriers travelling with the conveyer until it is possible for them to continue their travel without interrupting the carriers approaching the conveyer 10 on the conveyer 11.

The embodiment of the invention illustrated in Figs. 6, 7 and 8 is substantially identical to that of the first embodiment. In other words, the operating means including the motor 32, pinion 31, shaft 22, lever 21, link 20, lever 19, shaft 16 and the lever 23 on the shaft 22, may be employed for the embodiment illustrated in Figs. 6 and 8. The only difference in structure of the two embodiments lies in the mounting of a deflector element 114 on the shaft 16, which is given reference numeral 116 in Figs. 6 and 8, in place of the element 14 and the changing of the position of the stop 25 to limit the movement by actuating means in one direction to thus limit the normal position of the deflector arm or element. Otherwise, the mechanism for the two embodiments remains the same, this mechanism being utilized to accomplish two purposes which are basically similar, in that in each embodiment the element 14 in one and the deflector element 114 in the other are mounted for movement into and out of operative position over their respective conveyers, to discontinue the travel of certain of the articles thereon. In the first embodiment the element 14 stops the articles or carriers from further travel on the conveyer, whereas in the second embodiment (Figs. 6 and 8) the deflector element 114 discontinues the travel of articles or carriers on each conveyer by causing them to move off the conveyer onto another conveyer.

In the embodiment shown in Figs. 6, 7 and 8, conveyers 110 and 111 are shown, the deflector element 114 being adapted to discontinue the travel of certain carriers 112 on the conveyer 110 and cause them to travel onto the conveyer 111. The mechanism connecting the deflector element 114 with the power means, such as the motor 132 (Fig. 7), includes a lever 119 connected to a shaft 116, the outer end of the lever being pivotally connected to one end of a link 120. The other end of the link is pivotally connected to a lever 121 which is mounted upon a power shaft 122, the latter being driven by the motor 132 through means, such as pinion 131 and gear 130, in Fig. 6. An arm 123 mounted upon the shaft 122 is movable through the power means between stops 124 and 125, the latter being disposed in one of a plurality of apertures 126 in a suitable support therefor. A spring 127 is connected to the arm 123 to cushion its movement toward the stops 124 and 125.

Attention is now directed to control switches 140 and 141. The switch 140 is supported in selected position over the conveyer 110 to be actuated by pins 145 in certain of the carriers 112, to render a control means shown in Fig. 7 effective to cause actuation of the mechanism. The switch 141 functions to render the control means ineffective, this switch being actuated by a carrier which has been deflected onto the conveyer 111.

Attention is now directed to Fig. 7, which illustrates the electrical control means including the normally open switch 140 and the normally closed switch 141. Referring first to the motor 132, this motor is of the reversible torque type receiving its electrical energy from supply lines 146, 147 and 148 through contacts 150, 151 and 152. The contacts 150, 151 and 152 are illustrated in their normal positions, respectively forming electrical connections with the motor from lines 146, 148 and 147 at connections 153, 154 and 155 respectively. When the contacts are in this position the motor 132 is driven in a direction to move the deflector element 114, from an operative position across the conveyer 110 to its normal position as shown in Figs. 6 and 8. To move the deflector in the opposite direction, that is to operate the deflector element to cause discontinuation of movement of a carrier on the conveyer 110 or to deflect it from the conveyer 110 and onto the conveyer 111, the contacts 150, 151 and 152, through the energization of a relay 156, are moved to open the previously described circuits and to close the circuits connecting the contacts 150, 151 and 152, respectively, to lines 146, 147 and 148 at connections 153, 155 and 154, respectively.

When a carrier, provided with a pin 145 positioned to actuate the switch 140, moves into a position to bring about this result, a circuit is completed from a supply line 160 at connection 161 through the relay 156, switch 140, to another supply line 162 at connection 163. Upon energization of the relay 156, the contacts 150, 151 and 152 are moved from their first circuit arrangement to the second described arrangement, to reverse the motor 132. The relay 156 also closes a contact 164 to complete a locking circuit through the relay which may be traced from line 160 at connection 161 through the relay 156, connection 165, contact 164, normally closed switch 141, to line 162 at connection 163. Thus the relay 156 remains energized during the action of the deflector element toward the conveyer 111 and until the carrier affected by the deflector element has travelled on the conveyer 111 a sufficient distance to actuate the switch 141. When this occurs the locking circuit for the relay is opened, thus deenergizing the relay and allowing the contacts 150, 151 and 152 to resume their normal positions, causing reversal of the direction of the motor 132 to move the mechanism coupled with the deflector element into the normal position controlled by the stop 125.

A review of the two embodiments will reveal their similarity not only in mechanical features but also in the electrical control means. In each, the motor is driven normally in one direction to position the element associated therewith in its normal position, the circuits for the motor being under the control of contacts which are moved, through the energization of the relay, in a circuit controlled by switches or similar means under the control of carriers on the conveyers to actuate their respective elements to discontinue further travel of the carriers on their associated conveyers.

Although specific improvements of the invention have been shown and described, it will be understood that they are but illustrative and that various modifications may be made therein without departing from the scope and spirit of this invention as defined by the appended claims.

What is claimed is:

1. In a conveyer system comprising a first conveyer, a second conveyer extending in a direction transverse to the first conveyer, the conveyers being adapted to transport articles in given paths one converging with the other, an element supported adjacent one of the conveyers and actuable to stop movement of articles thereon, a unit for the first conveyer caused to function by an article approaching the juncture of the paths, a pair of units for the second conveyer spaced varied distances from the juncture of the path and caused to function at different time intervals by an article approaching the said juncture of the paths, and means rendered effective by the functioning of only one of the units for the second conveyer and the functioning of the unit for the first conveyer to actuate the element.

2. In a conveyer system comprising a first conveyer, a second conveyer extending in a direction transverse to the first conveyer, the conveyers being adapted to transport articles in given paths one converging with the other, an element supported adjacent one of the conveyers and actuable to stop movement of articles thereon, a unit for the first conveyer caused to function by an article approaching the juncture of the paths, a pair of units for the second conveyer spaced varied distances from the juncture of the path and caused to function at different time intervals by an article approaching the said juncture of the paths, and means rendered effective by the functioning of the unit for the first conveyer when the unit for the second conveyer spaced farthest from the juncture of the paths is functioning to actuate the element, the functioning of the remaining unit prior to the functioning of the unit for the first conveyer rendering the said means ineffective to actuate the element.

3. In a conveyer system comprising a first conveyer, a second conveyer extending in a direction transverse to the first conveyer, the conveyors being adapted to transport articles in given paths one converging with the other, an element supported adjacent one of the conveyers and movable into a stopping position in the path of articles thereon to stop movement of the articles, means for projecting a beam of light across the path of the articles on the first conveyer, a unit including an arm actuable by an article on the second conveyer, and operable means responsive to an interruption of the beam when the unit is actuated to cause movement of the element into the stopping position.

4. In a conveyer system comprising a first conveyor, a second conveyer extending in a direction transverse to the first conveyer, the conveyers being adapted to transport articles in given paths one converging with the other, an element supported adjacent one of the conveyers and movable into a stopping position in the path of articles thereon to stop movement of the articles, means for projecting a beam of light across the path of the articles on the first conveyer, a unit including an arm actuable by an article on the second conveyer, operable means responsive to an interruption of the beam when the unit is actuated to cause actuation of the element, and means actuable by articles on the second conveyer to render the last named means inoperative.

5. In a conveyer system comprising a first conveyer, a second conveyer extending in a direction transverse to the first conveyer, the conveyers being adapted to transport articles in given paths one converging with the other, an element supported adjacent one of the conveyers and actuable to stop movement of articles thereon, means for projecting a beam of light across the path of the articles on the first conveyer, a unit actuable by an article on the second conveyer, operable means responsive to an interruption of the beam when the unit is actuated to cause actuation of the element, and means interposed between the unit and the juncture of the paths to render the last named means inoperative when actuated by an article on the second conveyer.

6. In a conveyer system comprising a first conveyer, a second conveyer extending in a direction transverse to the first conveyer, the conveyers being adapted to transport articles in given paths one converging with the other, an element supported adjacent one of the conveyers and movable into a stopping position in the path of articles thereon to stop movement of the articles, means for projecting a beam of light across the said paths adjacent their juncture, a unit including an arm actuable by an article on the second conveyer, and means responsive to an interruption of the beam by an article on the first conveyer when the unit is actuated to cause movement of the element into the stopping position.

7. In a conveyer system comprising a first conveyer, a second conveyer extending in a direction transverse to the first conveyer, the conveyers being adapted to transport articles in given paths one converging with the other, an element supported adjacent one of the conveyers and movable into a stopping position in the path of articles thereon to stop movement of the articles, means for projecting a beam of light across the said paths adjacent their juncture, a unit including an arm actuable by an article on the said conveyor, and means responsive to an interruption of the beam by an article on the first conveyer when the unit is actuated to cause movement of the element into the stopping position and maintain the element in the said position during the travel of the article interrupting the beam from the first conveyer and onto the second conveyer.

8. In a conveyer system, conveyers to transport articles in given paths one converging with another adjacent the juncture of the conveyers, an element mounted for movement into and out of a stopping position in the path of an article on one of the conveyers, power means including a driven shaft, and a mechanism operatively connecting the shaft of the power means with the element to cause the said movement of the element and including pivotally connected members with their pivots disposed in a common plane with the shaft when the element is in the stopping position.

9. In a conveyer system, conveyers to transport articles in given paths one converging with another adjacent the juncture of the conveyers, an element mounted for movement into and out of a stopping position in the path of an article on one of the conveyers, power means including a driven shaft, and a mechanism operatively connecting the power means with the element to cause the said movement of the element and including relatively pivotal members having their pivots disposed in a common plane with the shaft when the element is in the stopping position to lock the element against movement by the articles.

10. In a conveyer system, a conveyer for the travelling of articles thereon, an element mounted for movement into and out of an operative position over the conveyer to discontinue the travel of certain of the articles on the conveyer, a power means including a driven shaft, and a mechanism operatively connecting the element with the shaft of the power means to cause the said movement of the element and including members disposed in relative dead center positions with respect to the shaft to lock the element in the operative position.

11. In a conveyer system, a conveyer for the travelling of articles thereon, an element mounted for movement into and out of an operative position over the conveyer to discontinue the travel of certain of the articles on the conveyer, a power means including a driven shaft, a mechanism operatively connecting the element with the shaft of the power means to cause the said movement of the element and including an arm and members disposed in relative dead center positions with respect to the shaft to lock the element in the operative position, and stops positioned to be engaged by the arm to terminate movement of the element at the said positions.

12. In a conveyer system, a conveyer for the travelling of articles thereon, an element mounted for movement into and out of an operative position over the conveyer to discontinue the travel of certain of the articles on the conveyer, a power means including a driven shaft, a mechanism operatively connecting the element with the shaft of the power means to cause the said movement of the element and including an arm and members disposed in relative dead center positions with respect to the shaft to lock the elements in the operative position, stops positioned to be engaged by the arm to terminate movement of the element at the said positions, and resilient means connected to the arm to retard the movement of the arm into engagement with the stops.

DONALD H. MITCHELL.